US009565427B1

(12) United States Patent
Blake et al.

(10) Patent No.: US 9,565,427 B1
(45) Date of Patent: Feb. 7, 2017

(54) HIGH DEFINITION MULTIMEDIA INTERFACE TEST SYSTEM

(71) Applicant: Steren Electronics International, LLC, San Diego, CA (US)

(72) Inventors: Joshua Blake, San Diego, CA (US); Brandon Clark, San Diego, CA (US)

(73) Assignee: Steren Electronics International, LLC, San Diego, CA (US)

( * ) Notice: Subject to any disclaimer, the term of this patent is extended or adjusted under 35 U.S.C. 154(b) by 0 days.

(21) Appl. No.: 15/044,051

(22) Filed: Feb. 15, 2016

(51) Int. Cl.
H04N 17/02 (2006.01)
H04N 17/00 (2006.01)
H04N 7/015 (2006.01)

(52) U.S. Cl.
CPC ............ *H04N 17/004* (2013.01); *H04N 7/015* (2013.01)

(58) Field of Classification Search
CPC ............................ H04N 171/004; H04N 7/015
USPC ................................ 702/117, 118; 710/1–62
See application file for complete search history.

(56) References Cited

U.S. PATENT DOCUMENTS

| 9,398,245 | B2* | 7/2016 | Suzuki | G09G 5/003 |
| 9,452,293 | B2* | 9/2016 | Rondoni | A61N 1/37217 |
| 2008/0129826 | A1* | 6/2008 | Musunuri | H04N 17/004 348/192 |
| 2009/0030635 | A1* | 1/2009 | Horan | H04L 1/243 702/85 |
| 2010/0318848 | A1* | 12/2010 | Yang | G06F 11/3656 714/30 |
| 2011/0037857 | A1* | 2/2011 | Chen | H04N 17/04 348/180 |
| 2011/0187385 | A1* | 8/2011 | Betz | G01R 31/021 324/543 |
| 2012/0013473 | A1* | 1/2012 | Huang | G08B 21/00 340/635 |
| 2012/0057075 | A1* | 3/2012 | Kabuto | G06F 3/14 348/564 |
| 2012/0136612 | A1* | 5/2012 | Vanderhoff | H04N 17/004 702/119 |
| 2012/0281069 | A1* | 11/2012 | Nishio | H04N 13/0048 348/43 |
| 2013/0162262 | A1* | 6/2013 | Johnson | G01R 31/11 324/539 |

(Continued)

*Primary Examiner* — Brian Yenke
*Assistant Examiner* — Humam Satti
(74) *Attorney, Agent, or Firm* — ARC IP Law, PC; Joseph J. Mayo (57) ABSTRACT

A high definition multimedia interface (HDMI) test system including an HDMI test device that includes a display, a microcontroller, first and second input ports, an output port, a first cable connector, a second cable connector, and a third cable connector. The HDMI test device couples to an external device and receives an HDMI signal from the external device via the first cable connector. The microcontroller receives the HDMI signal from the first input port and converts the signal to a video signal, wherein the display displays an image associated with the video signal. The microcontroller transmits a test HDMI signal to the third cable connector, receives the test signal from the second cable connector and compares the test signal transmitted to the third cable connector and the test signal received from the second cable connector to determine continuity of an HDMI cable coupled with the second and third cable connectors.

10 Claims, 7 Drawing Sheets

(56) References Cited

U.S. PATENT DOCUMENTS

| | | | |
|---|---|---|---|
| 2014/0226026 A1* | 8/2014 | Claramond | G09G 3/006 348/181 |
| 2014/0267780 A1* | 9/2014 | Spears | H04N 17/004 348/182 |
| 2014/0347189 A1* | 11/2014 | Weksler | H04M 1/72563 340/687 |
| 2014/0362295 A1* | 12/2014 | Suzuki | G09G 5/003 348/564 |
| 2016/0283361 A1* | 9/2016 | Alexander | G06F 11/3688 |

* cited by examiner

HIGH DEFINITION MULTIMEDIA INTERFACE TEST SYSTEM

BACKGROUND OF THE INVENTION

Field of the Invention

Embodiments of the invention generally relate to a high definition multimedia interface (HDMI) test system that includes an HDMI test device that displays video signals and performs HDMI continuity testing. Specifically, at least one embodiment of the invention receives an HDMI signal from an external device, converts the signal to a video signal and displays at least one image associated with the video signal so that an installer may set up a set top installation without a television on hand, and in addition, also provides HDMI cable continuity testing for the HDMI cables on a line-by-line basis for example.

Description of the Related Art

Technicians who install and troubleshoot television network connections, set-top boxes, and other audiovisual systems have a need for test equipment to verify and diagnose connections. One technique for verifying a connection is to attach a television and confirm that it displays video and sound correctly. However, this method is not always possible since an installing technician may install a network connection before a customer's television is available. There is no known test equipment that can verify a video and audio signal using a convenient, portable device, in lieu of using a television and that also provides for continuity testing of the HDMI cables so that the installer can be confident that after leaving, a user may connect a television to an HDMI cable and set top box and have a high degree of confidence that the television will work. This also lowers the number of trips to each installation in the case of no television present and/or a bad cable for example.

For example, if a video or audio signal is not received correctly by a television or by testing equipment, the problem may be with either the source of the signal (such as set-top box) or with the cable connecting the source to the television or equipment. Therefore, there is a need for a cable tester to also determine whether the connecting cable is functioning correctly. In particular, since television connections are often made using HDMI cables, there is also a need for an HDMI cable tester. HDMI cable testers known in the art are generally analog continuity testers, e.g., with lights that show whether there is a conducting path. There are no known HDMI cable testers integrated with video displays, and for example that generate a digital HDMI signal and verify that it is transmitted correctly through the cable.

For at least the limitations described above there is a need for an HDMI test system that receives and displays video signals, and that tests transmission through an HDMI cable.

BRIEF SUMMARY OF THE INVENTION

One or more embodiments of the invention include a high definition multimedia interface (HDMI) test apparatus that includes an HDMI test device with a housing. In at least one embodiment, the HDMI test device and the housing include one or more of a display, a microcontroller, a first input port, a second input port and an output port. In one or more embodiments, the HDMI test device and the housing include one or more of a first cable connector coupled to the first input port, a second cable connector coupled to the second input port, and a third cable connector coupled to the output port. One or more embodiments of the invention may utilize one input port and one output port, wherein the first input port may be utilized to receive external video and also received HDMI signals output from the apparatus to determine proper HDMI cable functionality.

By way of at least one embodiment, the HDMI test device may couple to an external device via an HDMI cable, and may receive an HDMI signal from the external device over the HDMI cable via the first cable connector that is coupled with the first input port. In one or more embodiments, the microcontroller may receive the HDMI signal from the first input port, convert the HDMI signal to a video signal, and send the video signal to the display. In at least one embodiment, the display may display at least one image associated with the video signal.

According to one or more embodiments of the invention, the microcontroller may transmit a test HDMI signal to the third cable connector via the output port and receive the test HDMI signal from the second cable connector via the second input port. In at least one embodiment, the microcontroller may compare the test HDMI signal transmitted to the third cable connector via the output port and the test HDMI signal received from the second cable connector via the second input port to determine continuity and/or proper transmission of high frequency signals on the HDMI cable coupled with the second cable connector and the third cable connector. In one or more embodiments, the microcontroller may display a continuity diagram that shows continuity wires in the HDMI cable on the display.

In at least one embodiment, the HDMI test device with the housing may include a speaker, wherein the microcontroller may obtain an audio signal from the HDMI signal and send the audio signal to the speaker. In one or more embodiments, the HDMI test device with the housing may include one or more of a battery coupled with at least the microcontroller and the display, and a micro universal serial bus (USB) port coupled with the battery. By way of at least one embodiment, the HDMI test device with the housing may include at least one button coupled with the microcontroller, wherein the microcontroller may adjust brightness, contrast, video format, or any combination thereof associated with the display according to input accepted via the at least one button.

According to one or more embodiments, the HDMI test device with the housing may include a switch, wherein the microcontroller may alter information displayed on the display according to a first mode and a second mode, wherein the first mode includes an HDMI video display mode, and wherein the second mode includes an HDMI cable test mode. In at least one embodiment, the microcontroller may automatically display the at least one image when the HDMI signal is detected on the first input port.

By way of one or more embodiments of the invention, the microcontroller may automatically display the continuity diagram associated with the HDMI cable coupled between the output port and the second input port when the HDMI cable is coupled between the output port and the second input port. In at least one embodiment, the microcontroller may automatically alter the display to show the at least one image or the continuity diagram according to whether the HDMI cable is connected to the first input port or between the second input port and output port. In one or more embodiments, the microcontroller may automatically alter the display to show the at least one image or the continuity diagram according to whether the HDMI signal is coupled last to the first input port or the second input port.

BRIEF DESCRIPTION OF THE DRAWINGS

The above and other aspects, features and advantages of at least one embodiment of the invention will be more apparent from the following more particular description thereof, presented in conjunction with the following drawings wherein.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 1:
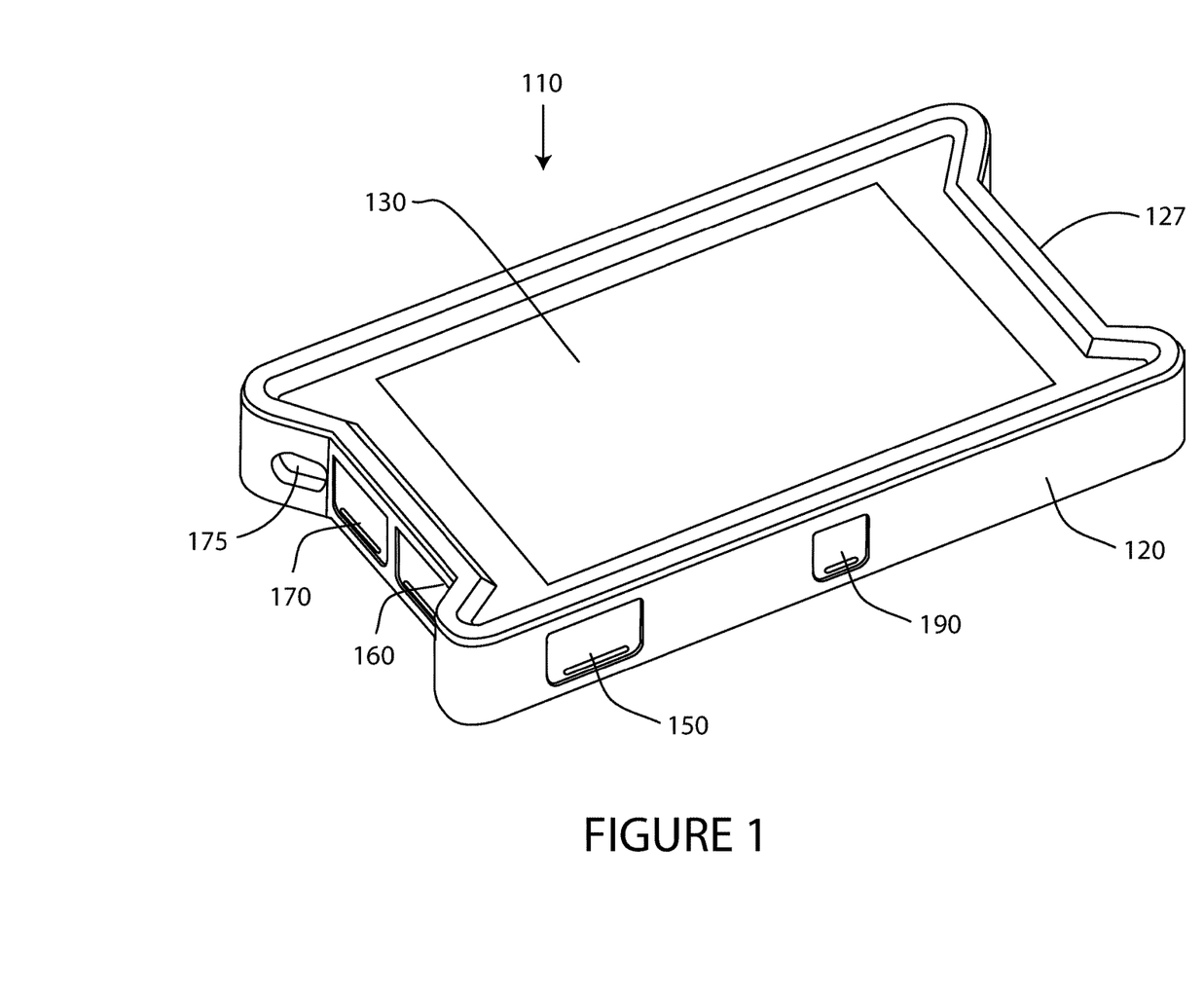
FIG. 1 illustrates an embodiment of the HDMI test device, showing the screen and the ports of the device.

FIG. 1 shows an embodiment of the invention that comprises a small, integrated display screen, multiple HDMI ports, and internal electronics to decode video (and possibly audio) signals and to check cable continuity. Device 110 has an external housing 120. In one or more embodiments the housing may be configured to be shock resistant and water resistant. For example, it may be made of an elastomeric material. The device may be hand held by an operator; therefore, the housing may be configured to be easy to hold, for example with a single hand. The device has a display screen 130, which may for example be an LCD screen, an OLED screen, or more generally any display. It has a speaker 175; one or more embodiments may have multiple speakers, for example in stereo configurations. One or more embodiments may have a display with no speaker. For example, to reduce manufacturing cost, one or more embodiments may not perform audio signal testing, or may provide a visual output on the display for the audio signal rather than playing audio through a speaker. In one or more embodiments, Device 110 has three HDMI ports, each with a connector configured to connect to an HDMI cable connector: the first HDMI input port 150 is configured to receive video signals that will be displayed on the display 130; the HDMI output port 170 may be connected via an HDMI loopback cable to secondary HDMI input port 160 to test continuity and/or proper digital transmission on the HDMI cable. This configuration is illustrative; one or more embodiments may arrange HDMI ports in different numbers and configurations. For example, in one or more embodiments the primary input port 150 may be utilized in lieu of the secondary input port 160, with the two functions (video display vs. continuity testing) selectable via hardware switches or software controls. Thus secondary input port 160 is optional and in some embodiments, one output port and one input port may be utilized to perform both continuity testing and to accept video to display. Embodiments having two input ports may test continuity of a given HDMI cable coupled with the second input port 170 and display video from the first input port 150 simultaneously in a split view mode on display 130, or in a switched manner on display 130.

Device 110 also has a micro USB port 190, which may be used for example for charging the device. One or more embodiments may use any type of charging mechanism, including USB or other power cables, or inductive charging. One or more embodiments may have no charging mechanism, but instead may use replaceable or externally rechargeable batteries. One or more embodiments may use AC power or DC power connections instead of or in addition to internal batteries.

Device 110 may also have one or more control buttons (not shown) or other input controls, for example arranged along edge 127, or more generally located in any convenient area of the device. One or more embodiments may use software input controls for example if display 130 includes a touchscreen capability. Input controls may be provided for functions that may include for example power on and power off, display control, speaker control, and function control for the video checking and cable continuity checking functions.

Figure 2:
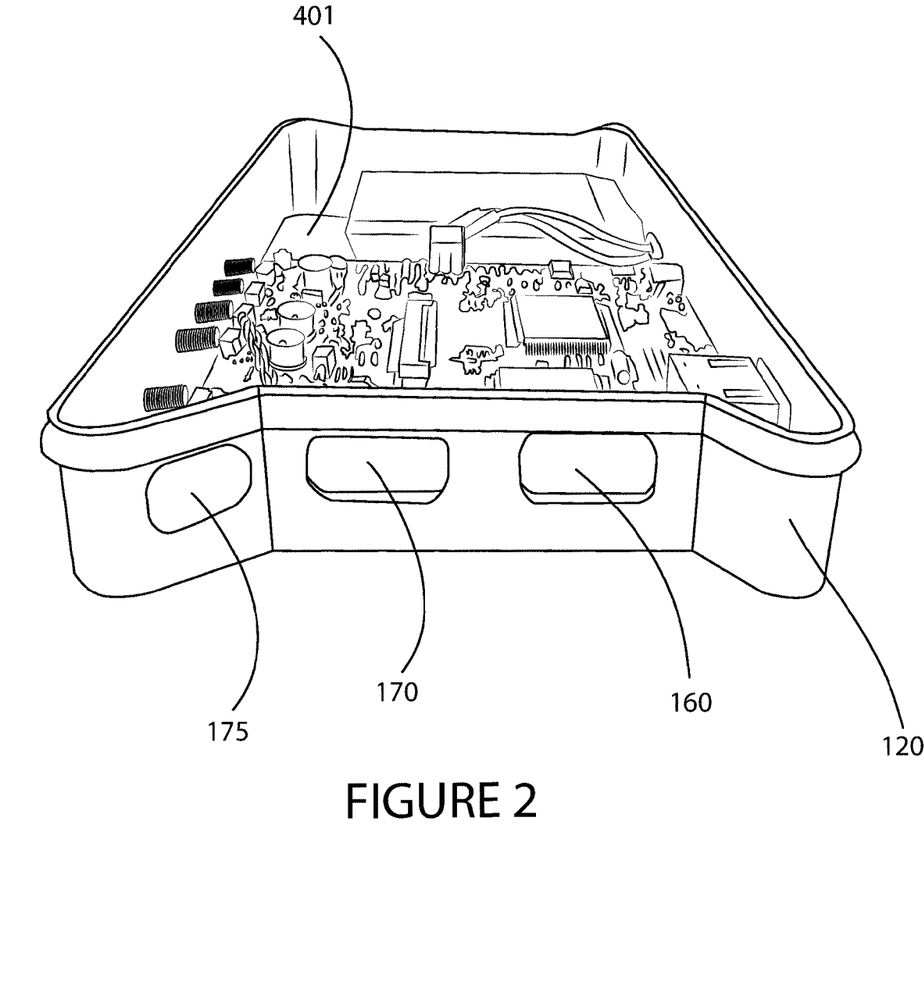
FIG. 2 shows a side view of the embodiment of FIG. 1.

FIG. 2 shows a side view of the embodiment of FIG. 1, with a view of HDMI output port 170, secondary HDMI input port 160, and speaker 175. As shown, with display decoupled, the interior 401 of the apparatus may hold the various electronic components, PCB, battery and connectors for example.

Figure 3:
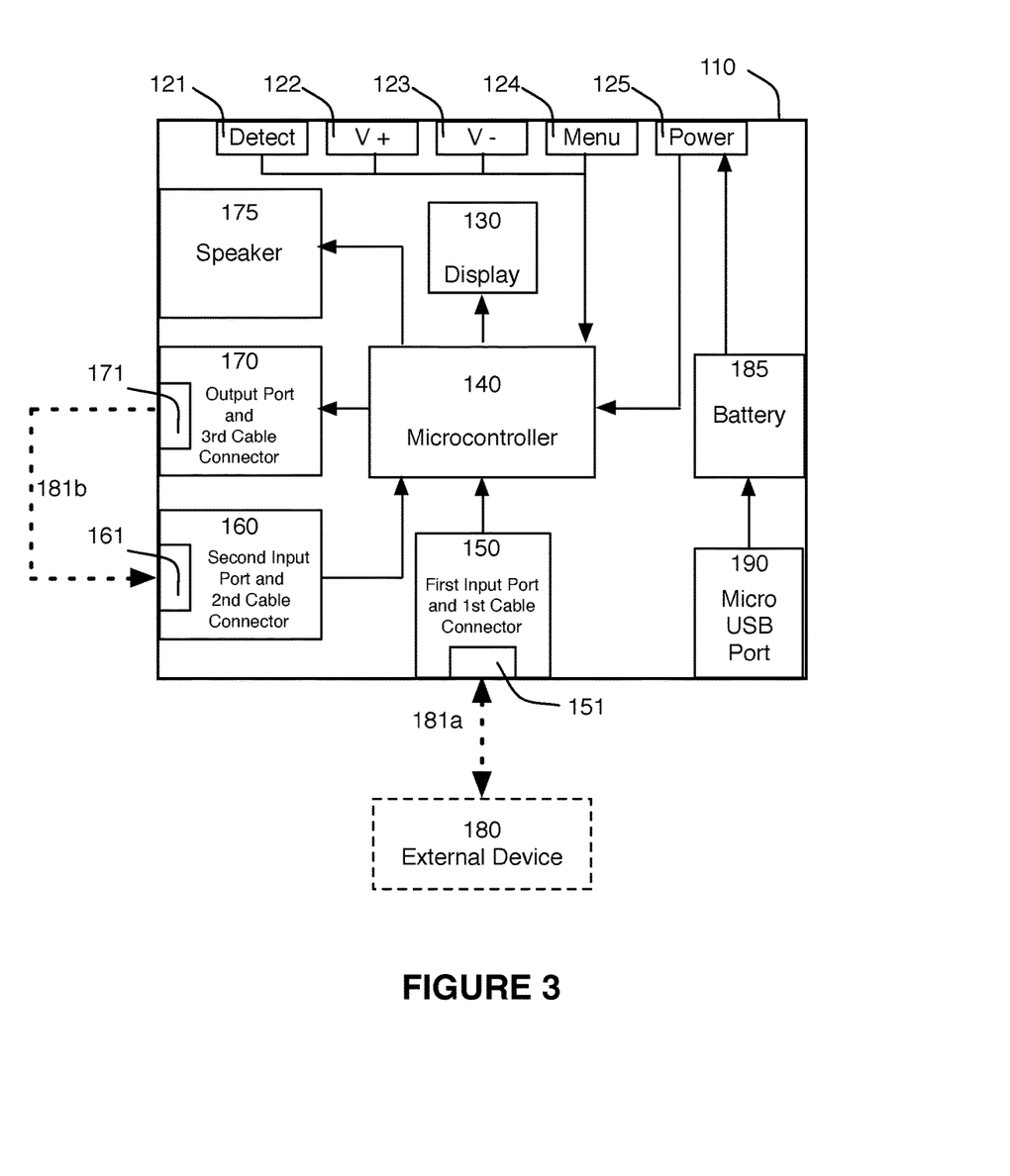
FIG. 3 is a functional block diagram of the electronic components of the embodiment shown in FIG. 1.

FIG. 3 shows a block diagram of the electronic components of an embodiment of device 110. Microcontroller 140 is connected to the HDMI ports including first input port 150, optional second input port 160, and output port 170; to display 130; and to speaker 175. One or more embodiments may have multiple microcontrollers or coprocessors in addition to main microcontroller 140. Microcontroller 140 also receives input from input controls 121, 122, 123, 124, and 125. These specific input controls are illustrative; one or more embodiments may use any number and configuration of input controls. The input controls may for example be simple switches or buttons. Device 110 also has a battery 185 that is connected to micro USB port 190 for charging. Power button 125 may be used to power up or power down the device 110.

To check a video source, a technician attaches HDMI cable 181a to connector 151 of primary HDMI input port 150, and also attaches the cable 181a to external device 180 that provides HDMI signals. Device 180 may be for example a set-top box for cable or satellite television. The HDMI signal is sent from port 150 to microcontroller 140, which decodes the video and displays it on display 130. The microcontroller may also decode the audio signal from port 150 and send the audio to speaker 175 for output. Video and audio may be controlled for example using input controls 122, 123, and 124. For example, Menu button 124 may cycle between several control modes, such as increase/decrease brightness, increase/decrease contrast, and increase/decrease audio volume; buttons 122 and 123 may then be used to increase or decrease the selected control.

To check an HDMI cable, a technician attaches HDMI cable 181b (which for example may be cable 181a) to connector 171 of HDMI output port 170, and to either connector 151 of first input port 150, or optionally to connector 161 of secondary HDMI input port 160. Having two input ports allows for testing two cables simultaneously for example to show video and continuity simultaneously if desired. The microcontroller 140 generates transmits a test signal to port 170, and checks the signal received on port 150 or optionally 160. By comparing the received signal to the transmitted signal the microcontroller 140 can determine if the cable 181*b* wires have continuity between the connectors on a wire-by-wire basis and/or otherwise determine that the HDMI signals are transmitted and received properly.

In one or more embodiments the microcontroller may operate in at least two modes: in video display mode the microcontroller decodes video (and optionally audio) received on port 150, and displays the video on display 130 (and may play audio on speaker 175); in cable continuity test mode the microcontroller sends an HDMI test signal to output port 170 and compares this signal to the received signal on secondary HDMI input port 160. In one or more embodiments the microcontroller may automatically determine which mode to operate in based on detecting which ports have attached cables. For example, a technician may press the Detect button 121 to cause the microcontroller to detect which input port (150 or 160) has an attached HDMI cable, and to set its operating mode accordingly. In one or more embodiments the detection may be automated, and may occur without requiring an input such as the Detect button 121, by for example defaulting to display video, or defaulting to display the continuity diagram, or default to displaying which ever display corresponds to a signal received on the first or second input, or default to a split screen mode to display both the continuity diagram and the video. In one or more embodiments the mode may be selected manually by an operator, for example using the Menu button 124 or by using another input control.

Figure 4:
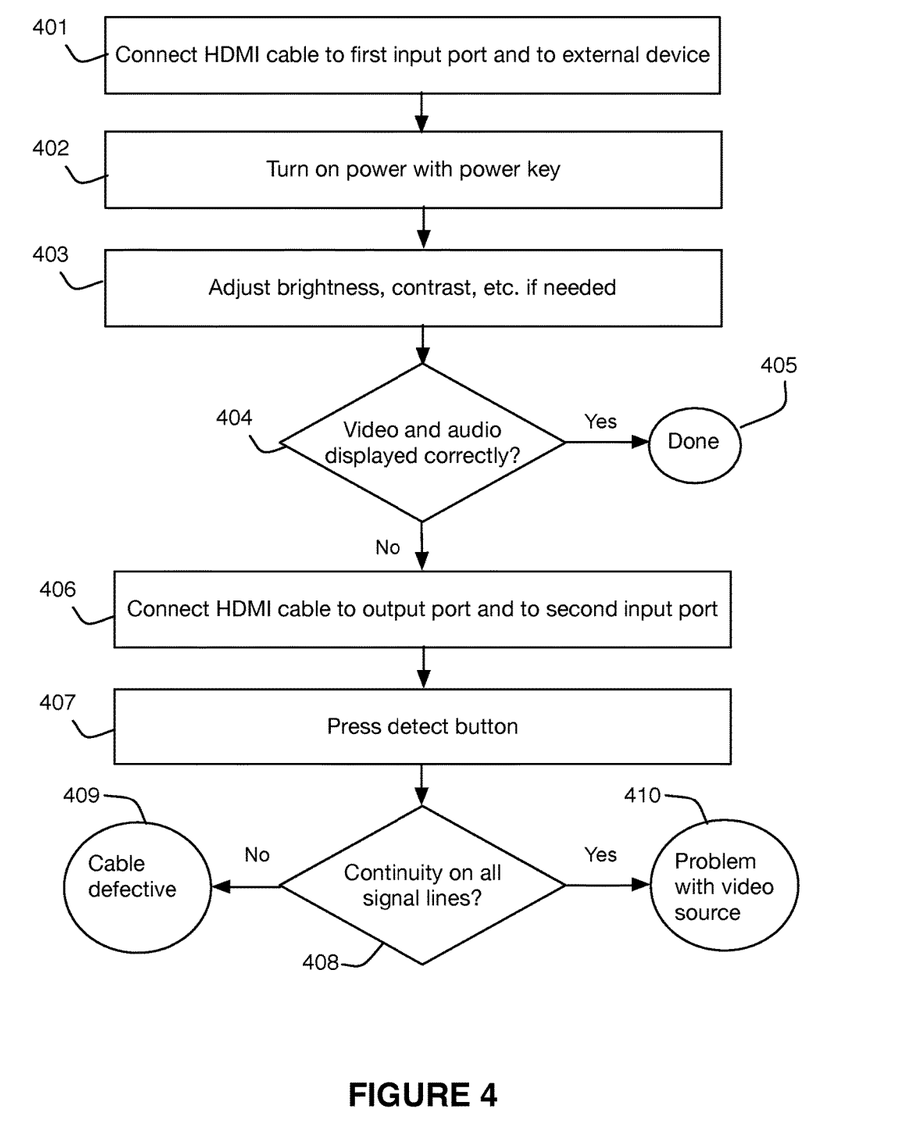
FIG. 4 shows a flowchart illustrating a test procedure that uses an embodiment of the invention to check and troubleshoot a video connection.

FIG. 4 shows a testing procedure flowchart that may be used by a technician to test video sources and HDMI cables using one or more embodiments of the invention. This flowchart is illustrative; embodiments of the invention may be used in various ways to test equipment in any desired manner and in any desired order. In step 401, the technician connects an HDMI cable to the primary input port 150 and to the external device 180 that provides the HDMI video source. In step 402, the technician powers up the device 110 using for example the Power button 125. In step 403, the technician adjusts the display brightness or contrast, if needed, and may adjust other parameters like audio output volume; these adjustments may be made for example using buttons 122, 123, and 124. In step 404, the technician determines whether video (and possibly audio) are displayed correctly. If so, the testing is done 405 and the system (video source and cable) is working properly. If not, the technician may proceed to determine whether the fault lies with the video source or with the HDMI cable. In step 406 the technician takes the HDMI cable that was connected in step 401, and connects it to the HDMI output port 170 and to the secondary HDMI input port 160. In step 407 the technician presses the Detect button 121; this causes the device to switch to cable continuity testing mode. The technician observes the continuity test output display, and in step 408 determines whether there is continuity on all signal lines of the HDMI cable. If so, the test determines 410 that the cable works correctly, and that the problem lies with the video source. If not, the test determines 409 that the HDMI cable is defective.

Figure 5:
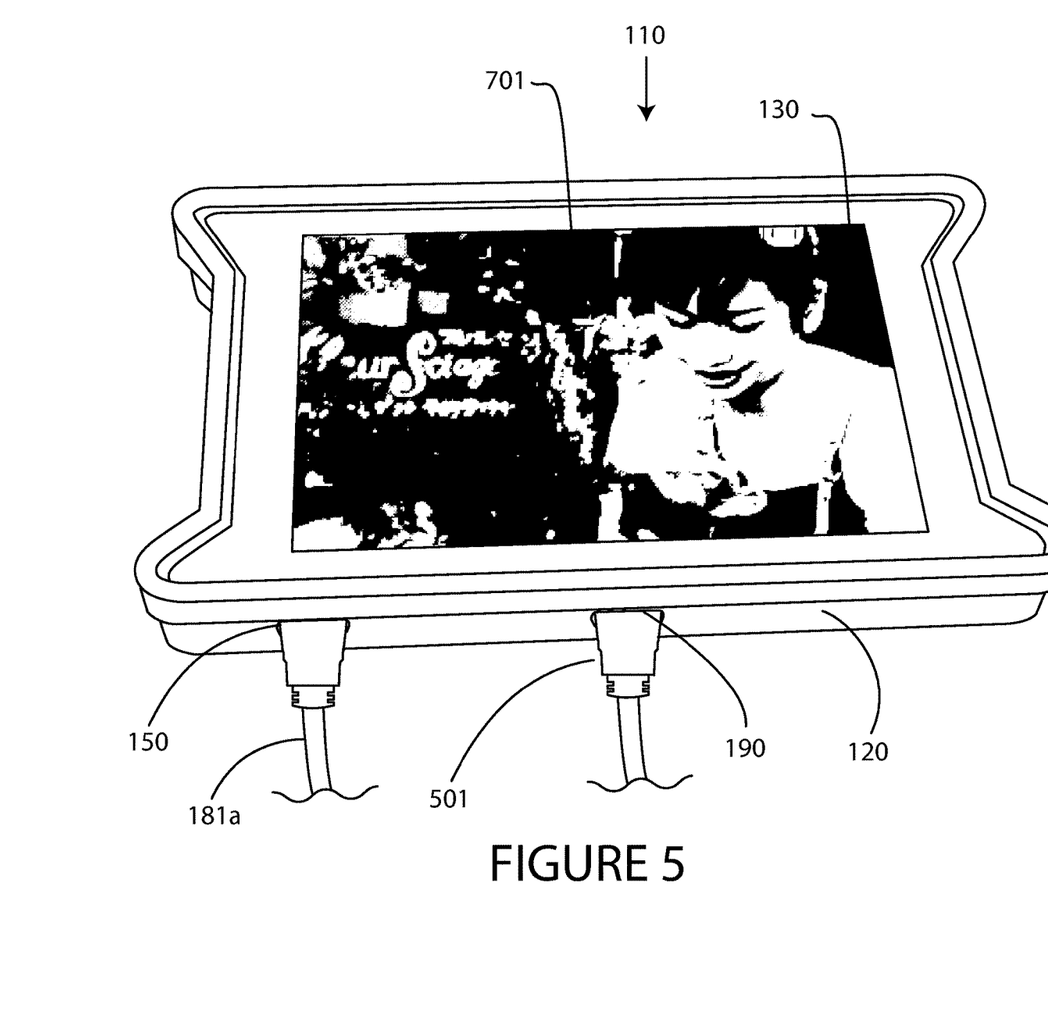
FIG. 5 illustrates the embodiment of FIG. 1 operating in a video display mode, with a cable connected to a video source and to the device's primary HDMI input port.
Figure 6:
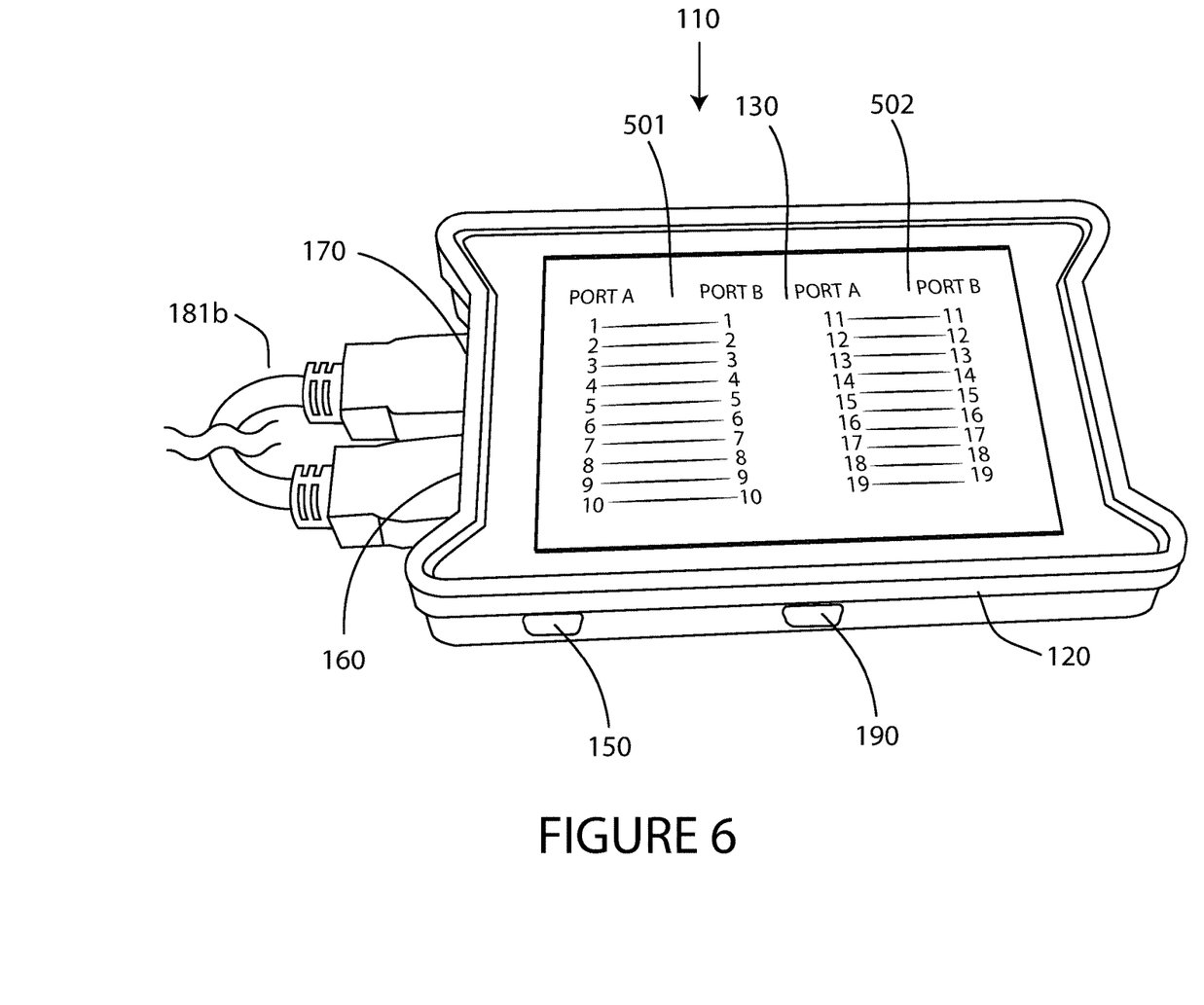
FIG. 6 illustrates the embodiment of FIG. 1 operating in continuity testing mode, with an HDMI cable looped back between the device's HDMI output port and its secondary HDMI input port.
Figure 7:
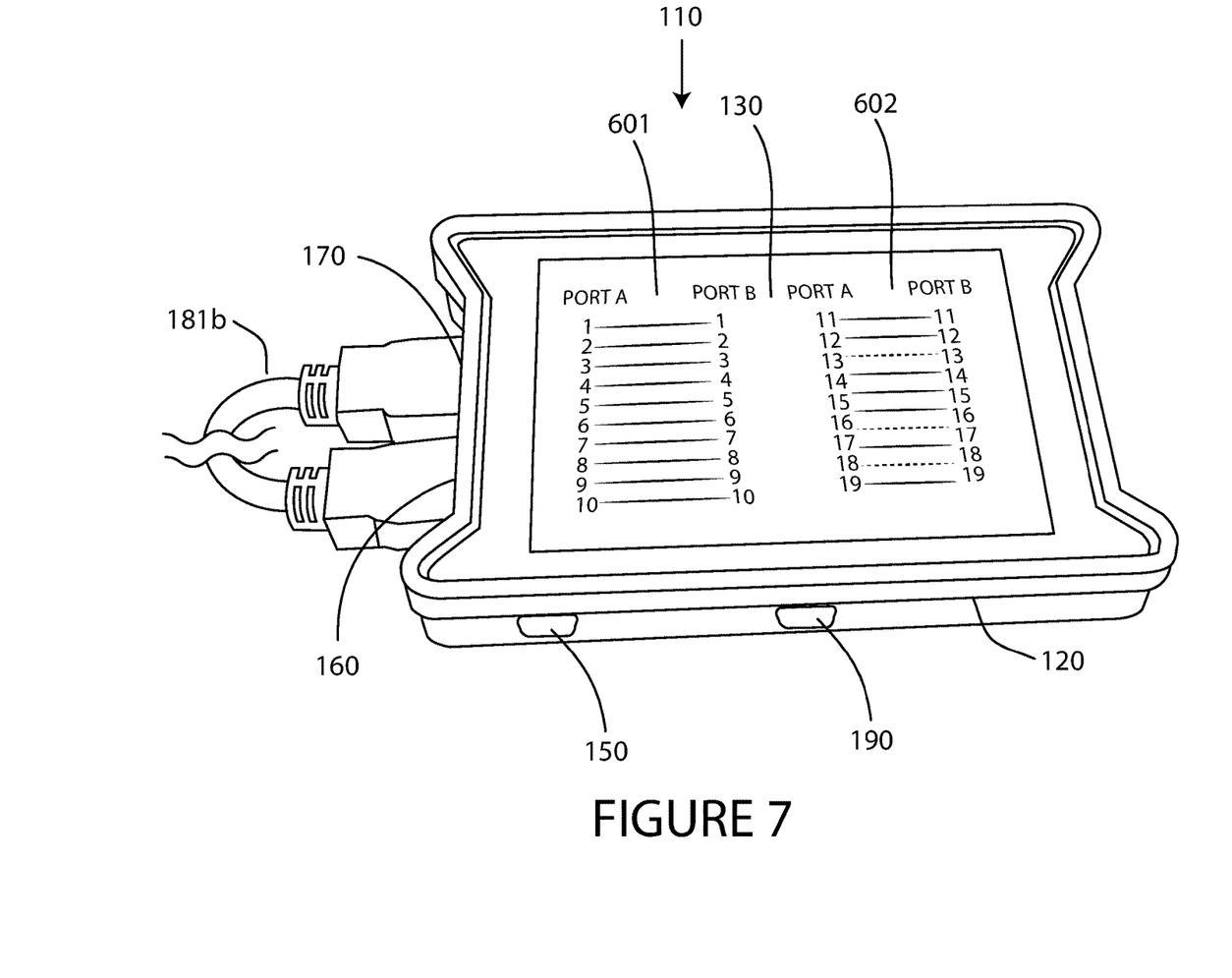
FIG. 7 illustrates a continuity test that detects problems with an HDMI cable.

FIGS. 5 through 7 show illustrative outputs on the device display for the video source test and the cable continuity test. FIG. 5 shows device 110 in video source test mode. HDMI cable 181*a* is connected to primary HDMI input port 150, and to an external video source (not shown). Video 501 is displayed on display 130, indicating that the source and the cable are functioning correctly. Power cable 501 is shown coupled with micro USB port 190, which may be implemented in any type of input port that may couple with a power source.

FIG. 6 shows device 110 in cable continuity test mode. HDMI cable 181*b* is connected to HDMI output port 170 and is looped back to secondary HDMI input port 160. Diagnostic output 601 and 602 is shown on display 130. This output shows whether continuity is detected on each of the 19 signal lines of the HDMI cable. In this illustrative output, continuity is detected on each signal line, so the cable is functioning correctly.

In contrast, FIG. 7 shows an illustrative output 701 and 702 for a defective cable. Lines 13, 16 and 18 appear to have transmission problems, as indicated through the absence of continuity lines, or through use of the graphic symbols that differ from continuity symbols used, showing lack of continuity for these lines in output 702. The graphics shown for the outputs 601, 602, 701, and 702 of the continuity test are illustrative; one or more embodiments may use any symbols, text, graphics, colors, or audio signals, or for example any other indicators that vary over time for colorblind individuals, to indicate the results of the continuity test. For example, one or more embodiments may combine the graphical outputs with an audio signal, with different tones to indicate successful continuity test results and unsuccessful continuity test results.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:
1. A high definition multimedia interface (HDMI) test apparatus comprising:
   an HDMI test device comprising a housing, wherein said HDMI test device with said housing comprises
      a display,
      a microcontroller,
      a first input port,
      an optional second input port,
      an output port,
      a first cable connector coupled to the first input port,
      a second cable connector coupled to the second input port, and,
      a third cable connector coupled to the output port,
   wherein the HDMI test device is configured to
      couple to an external device via an HDMI cable, and
      receive an HDMI signal from the external device over the HDMI cable via the first cable connector that is coupled with the first input port;
   wherein the microcontroller is configured to
      receive the HDMI signal from the first input port,
      convert the HDMI signal to a video signal, and
      send the video signal to the display;
   wherein the display is configured to display at least one image associated with the video signal;
   wherein the microcontroller is further configured to
      transmit a test HDMI signal to the third cable connector via the output port,
      receive the test HDMI signal from the second cable connector via the second input port or from the first cable connector via the first input port, compare the test HDMI signal transmitted to the third cable connector via the output port and the test HDMI signal received from the second cable connector via the second input port or from the first cable connector via the first input port to determine continuity of the HDMI cable coupled with the second cable connector and the third cable connector, and, display a continuity diagram that shows continuity wires in the HDMI cable on the display; and, wherein said microcontroller is further configured to alter information displayed on said display according to a first mode and a second mode, wherein the first mode comprises an HDMI video display mode, and wherein the second mode comprises an HDMI cable test mode.

2. The HDMI test apparatus of claim 1, wherein said HDMI test device with said housing further comprises a speaker, wherein the microcontroller is further configured to obtain an audio signal from said HDMI signal and send said audio signal to said speaker.

3. The HDMI test apparatus of claim 1, wherein said HDMI test device with said housing further comprises
- a battery coupled with at least said microcontroller and said display, and
- a micro universal serial bus (USB) port coupled with said battery.

4. The HDMI test apparatus of claim 1, wherein said HDMI test device with said housing further comprises at least one button coupled with the microcontroller, wherein said microcontroller is further configured to adjust brightness, contrast, video format or any combination thereof associated with said display according to input accepted via said at least one button.

5. The HDMI test apparatus of claim 1, wherein said HDMI test device with said housing further comprises a switch, wherein said microcontroller alters said information displayed on said display according to said first mode and said second mode via said switch.

6. The HDMI test apparatus of claim 1, wherein the microcontroller is further configured to automatically display said at least one image when the HDMI signal is detected on said first input port.

7. The HDMI test apparatus of claim 1, wherein the microcontroller is further configured to automatically display the continuity diagram associated with said HDMI cable coupled between said output port and said second input port when the HDMI cable is coupled between said output port and said second input port.

8. The HDMI test apparatus of claim 1, wherein said microcontroller is further configured to automatically alter the display to show said at least one image or said continuity diagram according to whether said HDMI cable is connected to said first input port or between said second input port and output port.

9. The HDMI test apparatus of claim 1, wherein said microcontroller is further configured to automatically alter the display to show said at least one image or said continuity diagram according to whether said HDMI signal is coupled last to said first input port or said second input port.

10. The HDMI test apparatus of claim 1, wherein said microcontroller alters said information displayed on said display according to said first mode and said second mode automatically.

* * * * *